United States Patent [19]
Fulton

[11] Patent Number: 5,420,789
[45] Date of Patent: May 30, 1995

[54] GEOMETRICALLY CORRECTED LARGE ANGLE WHISKBROOM SCANNER FOR LOW EARTH ORBITING SATELLITES

[75] Inventor: Truxton K. Fulton, Fort Wayne, Ind.

[73] Assignee: ITT Defense & Electronics, Fort Wayne, Ind.

[21] Appl. No.: 270,328

[22] Filed: Jul. 5, 1994

Related U.S. Application Data

[63] Continuation of Ser. No. 724,713, Jul. 2, 1991, abandoned.

[51] Int. Cl.$^6$ ............................................. G02B 26/10
[52] U.S. Cl. .................................. 364/420; 250/334
[58] Field of Search ............... 364/420; 250/330, 332, 250/334

[56] References Cited

U.S. PATENT DOCUMENTS

| | | | |
|---|---|---|---|
| 4,878,183 | 10/1989 | Ewart | 364/521 |
| 4,951,136 | 8/1990 | Drescher et al. | 358/109 |
| 4,989,086 | 1/1991 | Schaff et al. | 358/109 |
| 5,043,924 | 8/1991 | Hofmann | 364/525 |

Primary Examiner—Paul M. Dzierzynksi
Assistant Examiner—David Vernon Bruce
Attorney, Agent, or Firm—Barnes & Thornburg

[57] ABSTRACT

A scanning method and apparatus for providing a geometrically corrected large angle whiskbroom scan of a portion of the earth's surface using a linear array of radiation-sensitive detectors mounted in a low earth orbiting satellite contemplate: scanning a portion of the earth's surface with the array to define an irregularly-shaped swath on the surface which represents a field of view of the array, defining a regularly-shaped ground area of interest within the field of view of the array, dividing the area of interest into a number of pixel lines fewer in number than the number of detectors in the array and extending generally perpendicularly to the array, subdividing each pixel line into a plurality of pixels, each of which encompasses at least a portion of the field of view, selectively combining outputs from the detectors to provide a data signal representative of each pixel, and reconstructing a representation of the ground area of interest from the data signal.

14 Claims, 11 Drawing Sheets

RECONSTRUCTION OF PIXEL NUMBER 1

GEOMETRICALLY CORRECTED LARGE ANGLE WHISKBROOM SCANNER FOR LOW EARTH ORBITING SATELLITES

This is a continuation of Ser. No. 724,713, filed Jul. 2, 1991, abandoned.

BACKGROUND OF THE INVENTION

This invention relates generally to remote sensors of the type used in earth orbiting satellites and, more specifically, to a method and apparatus for providing a geometrically corrected, large angle scan of a portion of the earth's surface using a linear array of radiation-sensitive detectors mounted in a satellite.

Earth orbiting satellites equipped with remote sensing apparatus are well-known. Satellites used to gather meteorological and geological information often carry one or more detectors which are sensitive to light or other forms of radiation. Mirrors, lenses and other optical components are typically used to focus and direct incident radiation to the detector(s). The output(s) of the detector(s) may be connected to signal processing apparatus which processes the data received from the detector(s) and transmits it (either directly or following an intervening storage operation) back to earth.

A number of techniques for scanning the earth's surface with one or more radiation sensitive detectors are known. For example, a single detector may be rotated around an axis which extends coaxially with the velocity vector of the satellite. This technique produces a series of left-to-right (or right-to-left, depending upon the direction of rotation) scans across the earth's surface. If the rotation rate is high, relative to the velocity of the satellite, the left-to-right scans are generally perpendicular to the direction of travel. If the rate of rotation is slow, the scans will be nonperpendicular or skewed in the direction of travel. The effect of spacecraft velocity on scan geometry is discussed more fully below in connection with the subject invention.

It should be noted that, for purposes of this discussion, references to rotation or other movements of a single detector or an array of detectors for purposes of scanning the earth's surface may refer to actual movement of the detector relative to the earth's surface or other frame of reference or, alternatively, to rotation or movement of a mirror or other optical device relative to a "stationary" detector or detector array. Indeed, use of a rotating or reciprocating mirror to direct radiation to a detector or detector array is generally preferred.

Use of a single rotating detector offers advantages of straightforward design and simplicity in operation and maintenance. However, resolution may be somewhat limited, especially when a relatively high rotation velocity is required. A rotating detector is also somewhat inefficient since, depending upon the scan angle designated, the detector will be facing away from the target surface for a large part of each revolution.

An alternative to the single detector approach involves use of a linear array of detectors. One way in which a linear array of detectors may be used which does not involve mechanical scanning (i.e., movement of the array) is known as "push broom" scanning. In a system of this type, a stationary linear array of detectors is positioned perpendicularly to the velocity vector of the craft, and facing the surface to be scanned. This approach has been successfully implemented in applications requiring relatively small scan angles. In a push broom scanning system, the optical throughput is relatively high, the electrical bandwidth is relatively low, and there are fewer moving parts than in a mechanical scanning system. However, there are at least three significant problems which preclude the use of a push broom scanner in applications which specify relative large scan angles. One problem is unacceptable aberrations associated with very wide angle optics required to generate the desired scan swath. A second problem involves difficulty in achieving true radiometric calibration of the push broom device. A third problem relates to the relative electronic complexity associated with the large number of detector elements which must be used in order to achieve an acceptable resolution across a relatively wide swath.

A mechanical scanning technique in which a linear array of detectors may be advantageously used to obtain a relatively large angle scan is known as the "whiskbroom" scanning technique. In a whiskbroom scanner, a linear array of detectors is aligned in parallel with the velocity vector of the satellite (i.e., the along-track direction) and moved from side to side in a reciprocating manner generally perpendicularly to the velocity vector of the craft (i.e., the along-scan direction). The benefit of whiskbroom scanning, as compared to the single detector approach, can be described in terms of longer dwell or integration times which result in increases in resolution and greater signal-to-noise ratios. There is also a potential for achieving much greater scan efficiency with this approach since the detectors in the array are pointed toward the "target" for a much greater percentage of the available scanning time. However, certain geometrical anomalies peculiar to the whiskbroom approach can seriously degrade the image produced by a large angle scan by causing an overlapping or interweaving of contiguous scans. This degradation may be worsened by distortion caused by the velocity of the spacecraft unless a relatively complex mechanical arrangement is used to compensate for velocity in the scanning apparatus.

An object of the present invention is to provide a large angle whiskbroom scanning arrangement which offers improvements over other scanning arrangements known in the prior art.

Another object of the present invention is to provide a large angle whiskbroom scanning arrangement in which the geometrical anomalies inherent in the large angle whiskbroom scanner are addressed and accounted for advantageously.

Yet another object of the present invention is to provide a large angle whiskbroom scanning arrangement which compensates for distortion caused by the forward velocity of the spacecraft.

These and other objects are attained by a scanning arrangement for providing a geometrically corrected large angle whiskbroom scan of a portion of the earth's surface using a linear array of radiation-sensitive detectors mounted in a low earth orbiting satellite. The invention may be described in terms of a method which includes the following steps: scanning a portion of the earth's surface with the array of detectors to define an irregularly-shaped swath on the surface which represents a field of view of the array; defining a regularly-shaped ground area of interest within the field of view of the array; dividing the ground area of interest into a plurality of pixel lines extending generally perpendicularly to the array, the number of pixel lines being fewer in number than the number of detectors in the array;

subdividing each pixel line into a plurality of elements, each element encompassing at least a portion of a field of view of one or more of the detectors in the array; selectively combining outputs from the detectors to provide a data signal representative of each of the individual elements in each pixel line; and reconstructing a representation of the ground area of interest from the data signals. In a preferred embodiment of the invention, the ground area of interest is rectangularly-shaped and extends in the along-scan direction generally perpendicularly from the linear array. In this embodiment, the ratio of detectors in the array to pixel lines is at least three-to-one, and the in-scan detector subtense corresponds to a distance of approximately 500–600 meters along the ground. The step of selectively combining outputs from one or more of the detectors to provide a data signal representative of each of the individual elements in each pixel line includes normalizing the combined outputs of the detectors to provide for constant resolution across the scan. The outputs from the detectors are combined, and the representation of the ground area of interest is reconstructed, in accordance with a preferred set of conditions and relationships.

Other objects, advantages and novel features of the present invention will become apparent from the following detailed description of the invention when considered in conjunction with the accompanying drawings.

DETAILED DESCRIPTION OF THE DRAWINGS

Figure 2A:
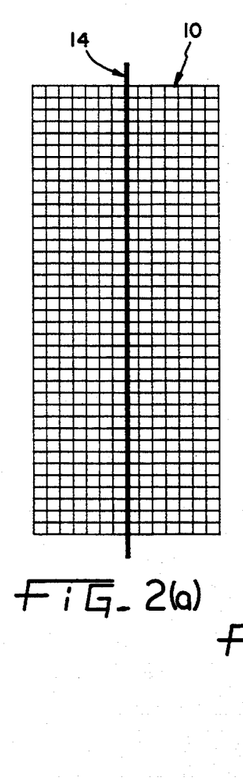
FIGS. 2(a), 2(b), 2(c) and 2(d) show the "footprints" of a multi-element array at various points along the scan, illustrating the manner in which the footprints expand as the array scans outwardly from nadir.
Figures 2B, 2C:
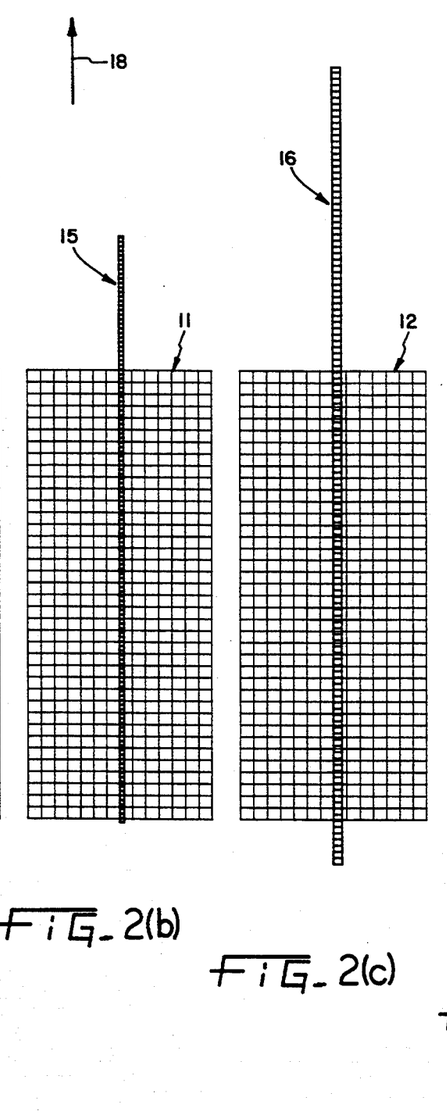
Figure 2D:
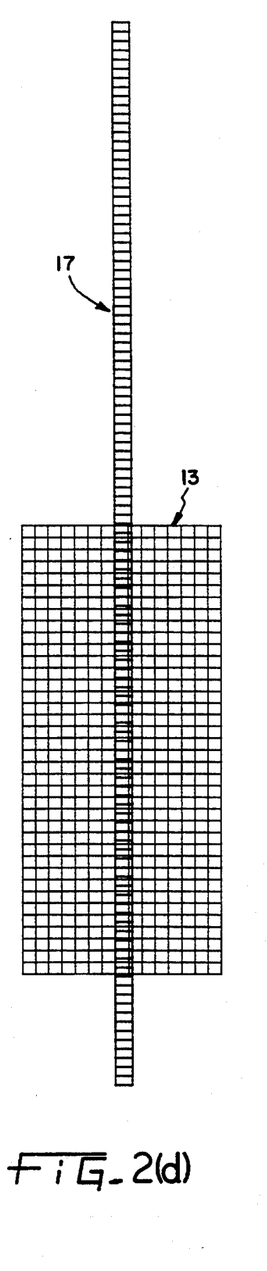

Remote sensing satellites are typically stationed at an altitude of several hundred kilometers above the earth's surface. A large-angle scanner scans a "swath" or portion of the earth which may extend 1000–2000 kilometers on either side of the satellite. For example, a remote sensing system mounted in a satellite orbiting at an altitude of 833 kilometers above the earth and having a scan angle of ±56.25° will define a swath on the earth's surface having a "width" in the along-scan dimension (i.e., the dimension which extends perpendicularly to the velocity vector) of 3076 kilometers. The dimension of the swath which extends parallel to the velocity vector (i.e., the along-track dimension) is determined by the number of detectors in the linear array and the dimensions of the fields of view of each detector. As the scanning process progresses from side-to-side, an integration operation is used to define an in-scan dimension of the "instantaneous field of view" of the array. In the specific embodiment which is described for purposes of illustration below, the instantaneous field of view (or IFOV) is defined as an area of 600×600 meters. In the along-track direction, the 600 meter dimension of the IFOV at nadir (i.e., a point directly below the satellite) will encompass the actual fields of view of a plurality of detectors (for example, 3 in FIG. 2(a) and FIGS. 10 and 11). In the along-scan direction, the 600 meter dimension is fixed by integrating the outputs of the detectors over appropriate time intervals. The dimensions of the designated IFOV may be increased or decreased, in which cases more or fewer detectors and shorter or longer integration intervals may be specified.

In the along-scan direction, the width of the swath in the system described in the preceding paragraph subtends an angle of 3076/6371=0.48 radians (where 6371 is the radius of the earth in kilometers). In the along-track direction, each IFOV subtends an angle of 0.6/6371=94 microradians. By disregarding this small along-track curvature, the "footprint" defined by the scan may be considered as having been formed on a cylindrical surface, and can thus be flattened to a two-dimensional map.

Figure 1:
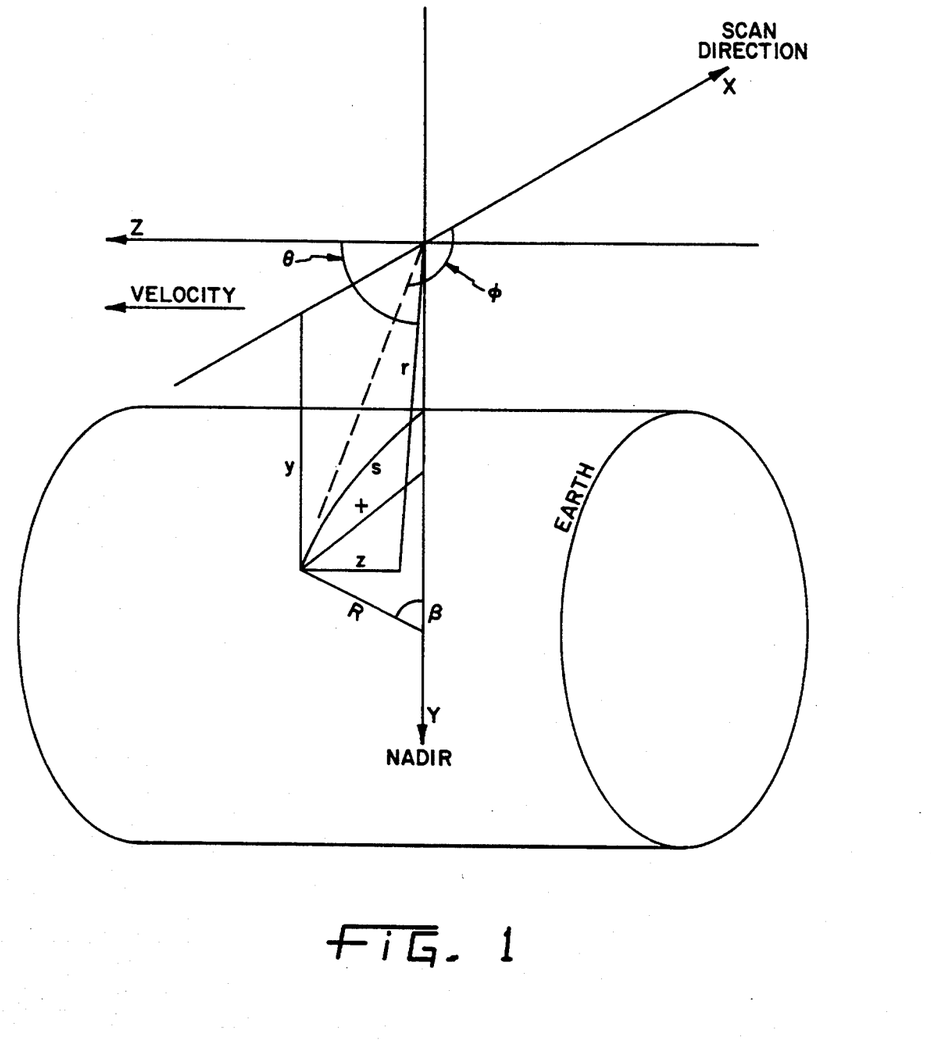
FIG. 1 shows a spherical coordinate system in which a satellite is positioned at the origin and moves along an axis which lies parallel to a cylindrical representation of the earth.

A spherical coordinate system can be adopted in which the satellite is positioned at the origin and moves along the Z-axis and cylindrical earth is parallel to the Z-axis and spaced a distance Y from the origin. The along-scan direction parallels the X-axis. This coordinate system is illustrated in FIG. 1.

The expression for cylindrical earth is $$x^2 + (y-D)^2 = R^2 \qquad 1)$$

Transforming into spherical coordinates and solving for r (the line of sight) yields:

$$r = \frac{-b - \sqrt{b^2 - 4ac}}{2a} \qquad 2)$$

where
$a = \sin^2\theta$
$b = -2D \sin\theta \sin\phi$ $c = D^2 - R^2$
$R = 6371$ km (earth's radius)
$D = 6371$ km $+ 833$ km $= 7204$ km (earth's radius plus satellite altitude)
Half of the cross-scan dimension is represented by $$Z = r \cos \theta \qquad 3)$$

The in-scan dimension (arc length) is given by $$S = R\beta \qquad 4)$$

$$\text{where } \beta = \sin^{-1}\left[\frac{D}{R} \sin(\pi/2 - \phi)\right] - (\pi/2 - \phi)$$

Footprint Expansion

At nadir, 600 meters on the ground corresponds to an IFOV of $0.6/833 = 720$ μrad. Looking now at the end of the scan,
$\theta = \pi/2 - 729/2$ μrad $= 1.570436$ rad
$\phi = -56.25° = 0.589049$ rad
$r = 1831.92$ km
$Z = 0.660$ km
And so there is a $$\frac{2(.660)}{.600} = 2.20$$

expansion of the footprint in the along-track dimension at the end of the scan.

In the in-scan dimension, $\phi$ equal to 0.589049 rad corresponds to an arc length of 1538.09 km. Likewise, 0.589049 rad $- 720$ μrad $= 0.588329$ rad and corresponds to an arc length of 1541.97 km.

And so there is a $$\frac{1541.97 - 1538.09}{.600} = 6.46$$

expansion of the footprint in the along-scan dimension at the end of scan.

FIGS. 2(a), 2(b), 2(c) and 2(d) show projections of the individual footprints of the detectors of a 126-element array at nadir (14), 500 km from nadir (15), 1000 km from nadir (16) and 1500 km from nadir (17), respectively. Grids 10, 11, 12 and 13 in these figures represent areas on the ground which are subdivided into 38 rows of regularly-shaped (e.g., 500 m to 600 m square) ground patches. The in-scan detector subtense is set at approximately 130 μrad so that the length of the resulting footprint expands to approximately 700 meters as the footprint approaches the end of the scan. The "shifting" of footprint patterns 14, 15, 16 and 17 in the direction of travel (arrow 18) relative to grids 10, 11, 12 and 13 is caused by the forward velocity of the array, and is discussed in additional detail below.

The Z-Effect

Figure 3:
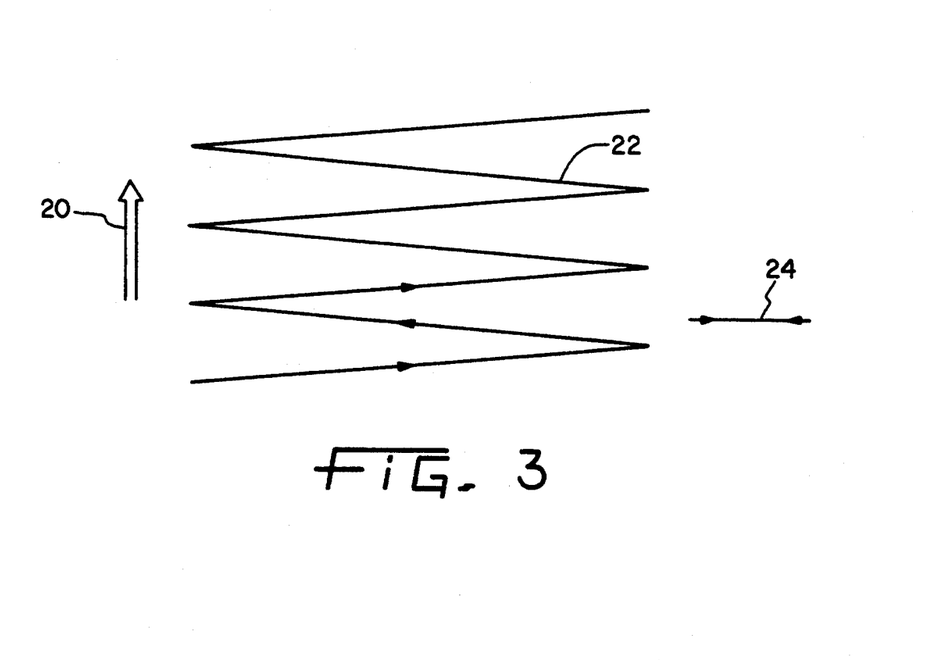
FIG. 3 illustrates the effect of the forward velocity of the spacecraft on a reciprocating scan system.
Figure 4:
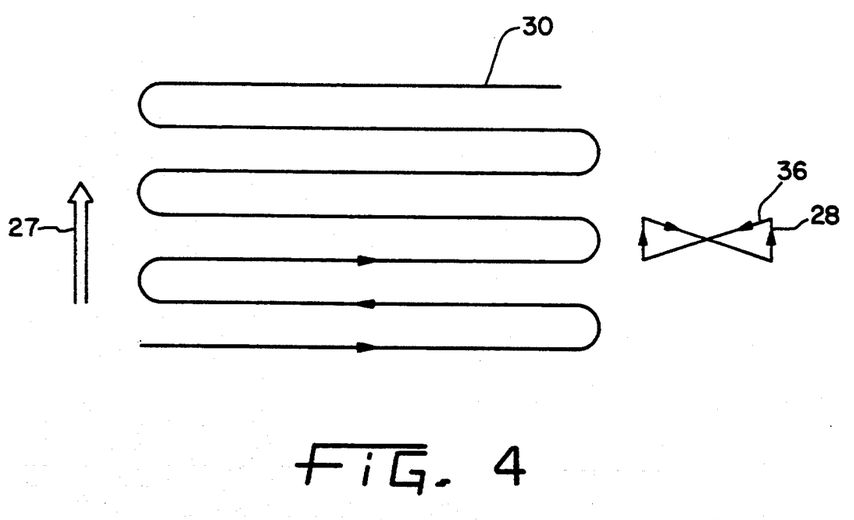
FIG. 4 shows a scan pattern which results when a reciprocating scanner is mechanically corrected to compensate for the effect of the forward velocity of the spacecraft.

The effect of the forward velocity of the spacecraft on a reciprocating scan system is the creation of a "Z" pattern in the ground tracks. This is illustrated in FIG. 3 in which arrow 20 indicates the directional component of the spacecraft velocity vector, line 22 illustrates the uncorrected "Z" pattern created by the reciprocating scan, and line 24 illustrates the reciprocating motion of the scan. One solution to this problem which involves some mechanical complexity requires that the scanning mechanism, which normally moves a scanning mirror from side-to-side, include motion along the axis which lies parallel to the velocity vector. FIG. 4 shows a mechanically corrected two-axis scan pattern. As indicated at 26 in FIG. 4, each side-to-side sweep includes a component of motion acting in opposition to the direction of the forward velocity (arrow 27) of the satellite. At the end of each side-to-side sweep, the scanning mechanism moves forward in the direction of arrow 27, as indicated by arrow 28, before beginning the next side-to-side sweep. The result is a corrected scan pattern which is illustrated by line 30.

Interwoven Ground Tracks

Figure 5:
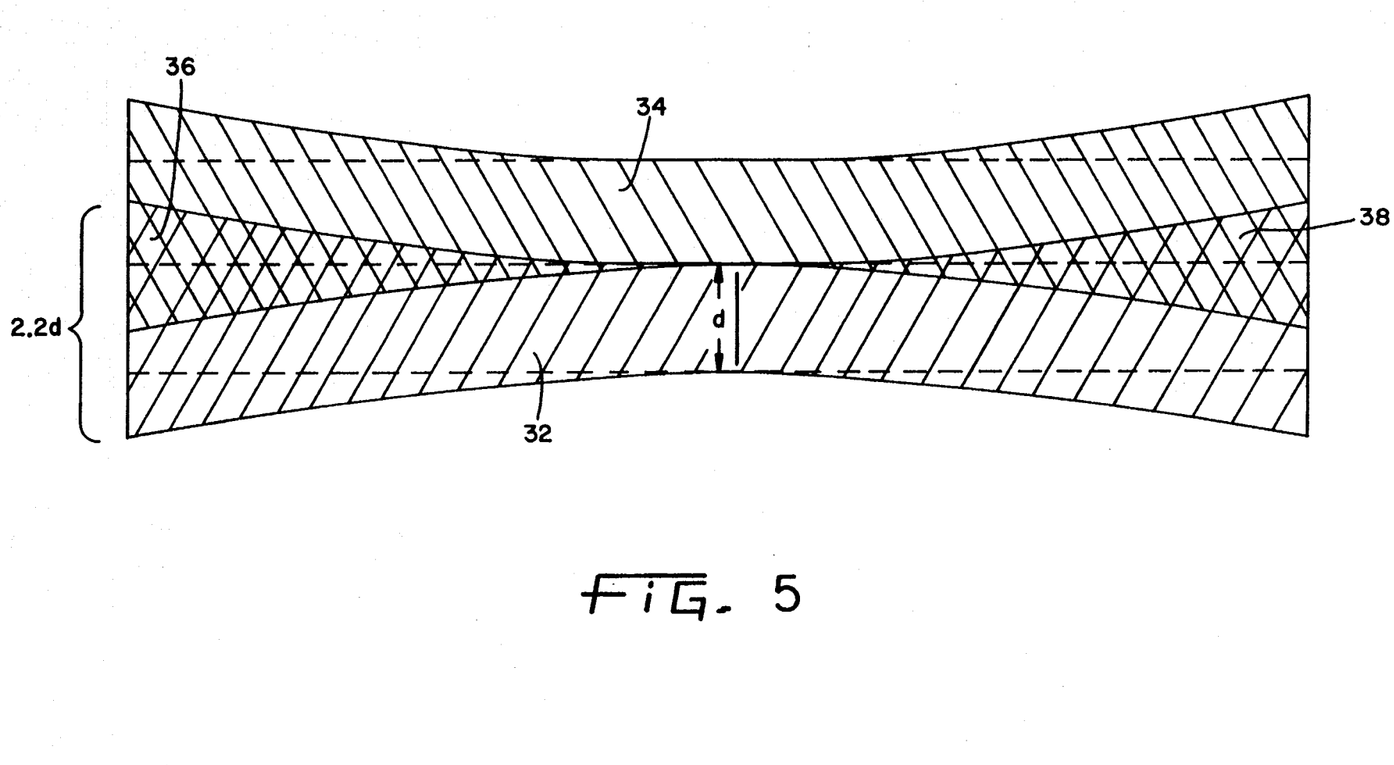
FIG. 5 illustrates the effect of footprint expansion in the along-track direction, and the resulting overlap of contiguous swaths.

FIG. 5 illustrates the effect of the 2.2 expansion factor in the along-track direction. Shown in FIG. 5 are the ground tracks of two contiguous swaths 32 and 34 of a single detector array. Swaths 32 and 34 are idealized since the skewing which results from the Z-Effect is not shown (i.e., swaths 32 and 34 are "instantaneous" swaths). The expanded width of each swath at the ends of the scan which, in the example cited above, is 2.2 times the width at nadir, causes an overlap in the areas designated 36 and 38. This overlap translates into a loss of resolution which increases toward the ends of the scans.

The dashed lines in FIG. 5 define contiguous rectangular ground areas of interest within each swath. The rectangular areas of FIG. 5 are undivided. This is analogous to a single detector instrument in which each rotation of the detector creates what can be referred to as a pixel or pixel line across the target surface. In the case of a single detector, the width of each pixel is the width of the swath or field of view observed by the detector. In a preferred arrangement which utilizes a linear array of detectors, the rectangular ground area of interest may be divided "horizontally" (i.e., alongtrack) into a plurality of pixels or pixel lines, and the width of each pixel line may be defined to include the field of view of more than one detector.

Increasing the instrument's pixel-per-swath count from unity to some larger number appears straightforward and, in fact, at small scan angles incurs no unforseen problems. At larger scan angles, however, geometrical anomalies peculiar to the whiskbroom approach preclude a simple upscaling in which each pixel line is represented by one or more detectors in a linear array. The following discussion describes the nature of these geometrical anomalies and discloses a pixel line subdivision/reconstruction scheme which may be advantageously used with a large angle whiskbroom scanning arrangement. As an added benefit, the need for mechanically controlling the scan about a second axis to compensate for the "Z Effect" is eliminated.

Figure 6:
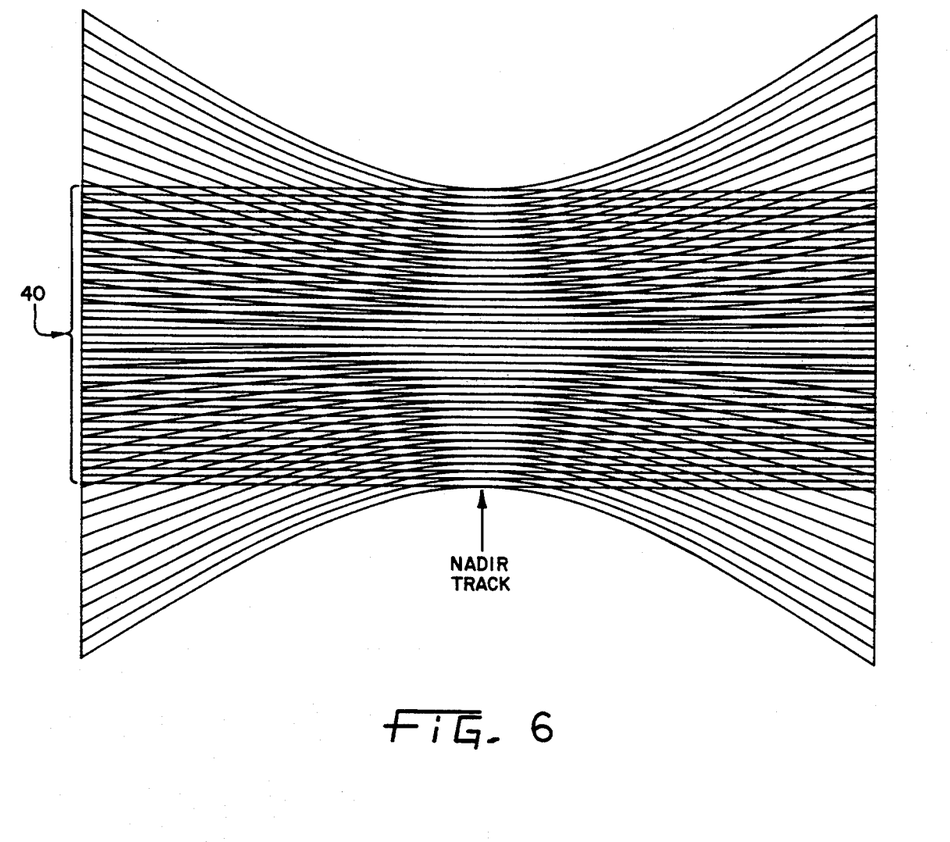
FIG. 6 shows the ground tracks which result from one swath of a 38-element linear array in which compensation has been made for the forward velocity of the spacecraft.
Figure 7:
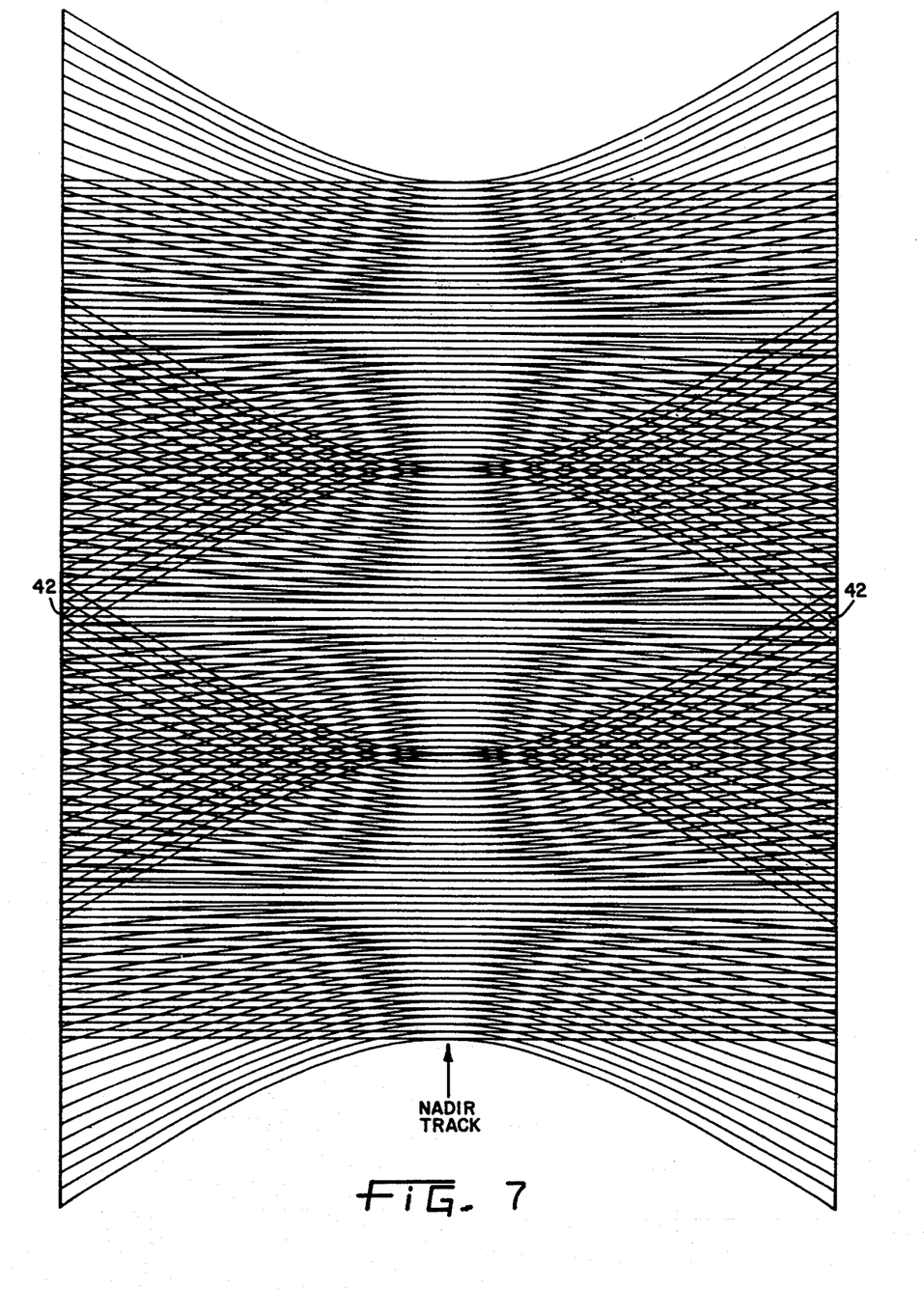
FIG. 7 shows the ground tracks which result from three overlapping contiguous swaths, each identical to the single swath shown in FIG. 6.

FIG. 6 illustrates the ground tracks which result from one swath of a 38 element linear array in which compensation has been made for the forward velocity of the spacecraft (the Z-Effect). The swath of FIG. 6 is superimposed upon a rectangular ground area of interest 40 which has been divided into 38 pixel lines. FIG. 7 shows three contiguous swaths, each identical to that shown in FIG. 6. FIG. 7 illustrates a problem inherent to large-angle whiskbroom scanners. The expansion factor causes the overlapping ground tracks to be interwoven in a more complicated way, with detector tracks from non-contiguous swaths overlapping in the "triangular" areas designated by reference numeral 42.

Figure 8:
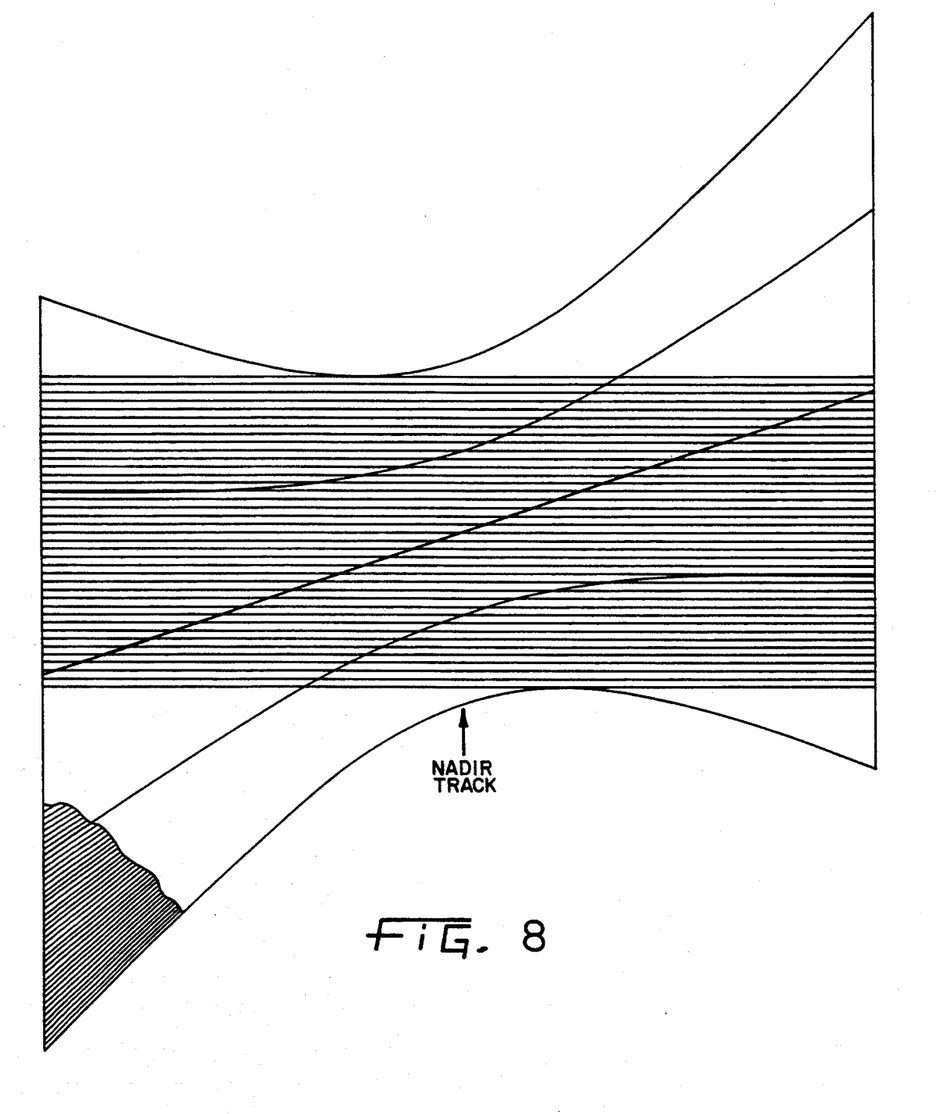
FIG. 8 shows the ground tracks which result from one swath of a 38-element linear array in which no compensation for the forward velocity of the spacecraft has been made.
Figure 9:
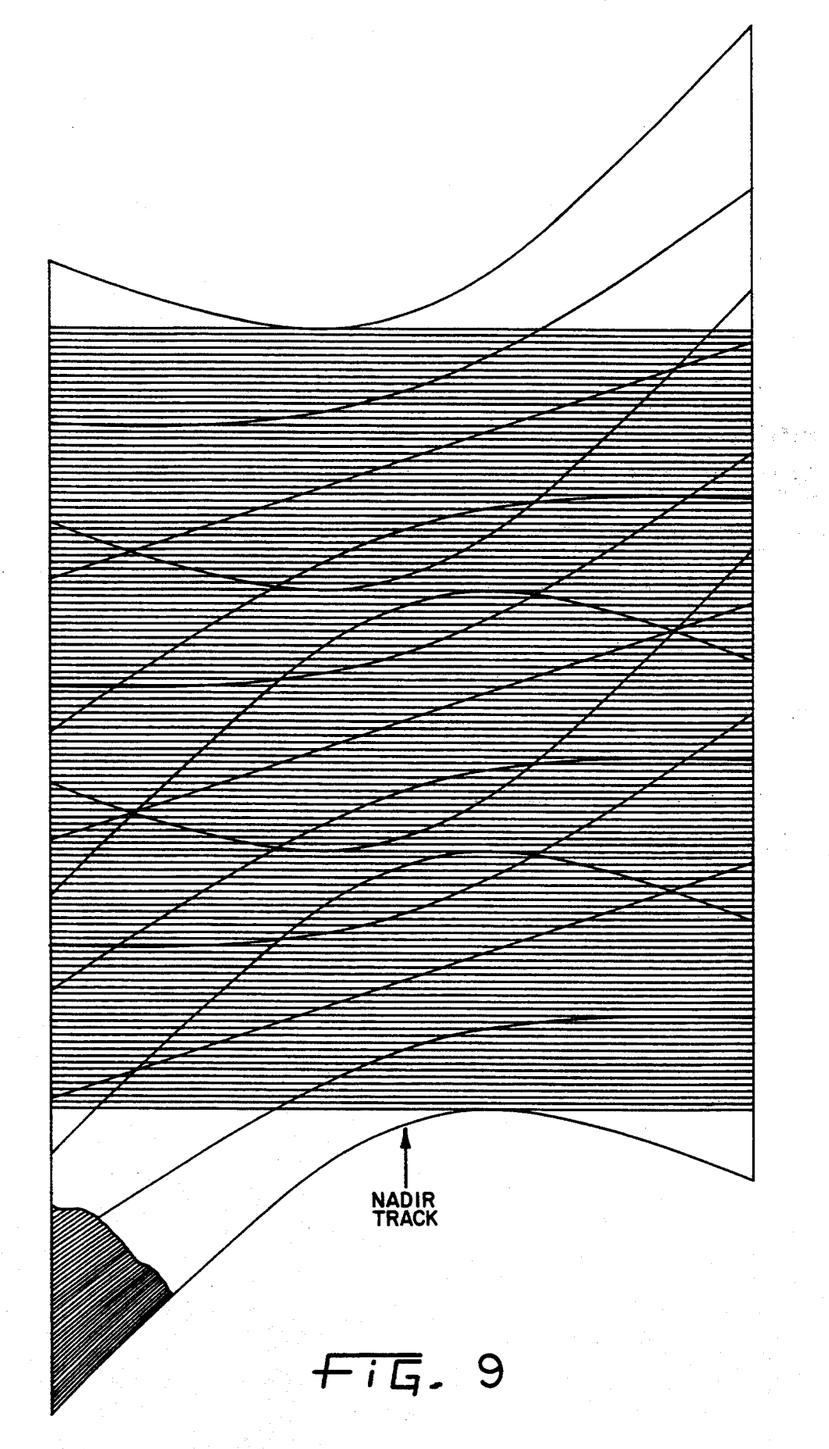
FIG. 9 shows three contiguous uncompensated swaths which further illustrate the interwoven nature of the overlapping ground tracks of the individual detectors.

FIG. 8 shows the ground tracks of a 38-element array in which no compensation for the Z-Effect has been made. FIG. 9 shows three contiguous uncompensated swaths, each like the swath of FIG. 8. FIG. 9 further illustrates the interwoven nature of the overlapping ground tracks of the detectors, and the added impact of the Z-Effect. The interwoven and overlapping nature of the ground tracks in the areas closest to the ends of the scan make straight-forward use of the scan data to reconstruct the image problematical if a relatively high degree of resolution is required.

Pixel Subdivision/Reconstruction

A solution to the problem of interwoven ground tracks requires that a regularly-shaped ground area of interest be defined within each of the skewed and expanded swaths of the detector array. The area of interest is then divided into a plurality of pixels or pixel lines extended across the area of interest in the in-scan (or along-scan) direction. Each pixel line is then subdivided into elements, each of which encompasses, and may be represented by, the field(s) of view of one or more detector(s) in the array. During the course of the scan, electronic circuitry determines which detectors correspond to and should represent each element of each pixel line, and combines the detector outputs accordingly. When the outputs from more than one detector are selected for a particular element, the outputs are "averaged" or "normalized" to maintain a relatively constant resolution across the scan. The pixel lines are reconstructed by selecting detector outputs in such a way that the resulting reconstructed ground tracks are always perpendicular to the velocity vector of the satellite.

Figure 10:
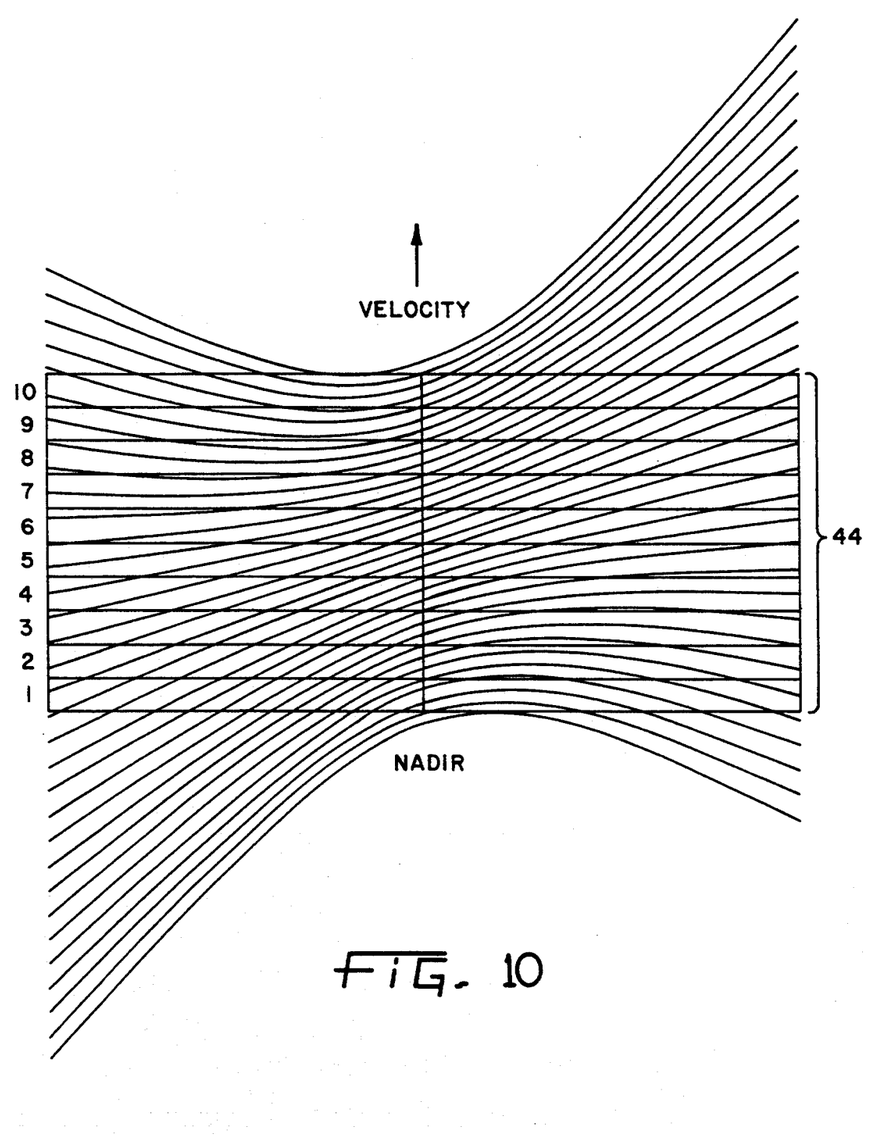
FIG. 10 shows the ground tracks created by a 32-element array in a single swath, and the division of a regularly-shaped ground area of interest into a plurality of pixel lines.

FIG. 10 shows the ground tracks created by a 32-element array in one swath. A subsatellite rectangular ground patch 44 having a length which corresponds to the length of the scan (as determined by the altitude of the satellite and the total scan angle) is defined in the area covered by the swath. Ground patch 44 is divided into 10 pixel lines, and has a width equal to 10 times the width of one pixel line. Ground patch 44 is centered under the satellite when the scan is pointing at nadir.

The pixel subdivision/reconstruction approach of the present invention eliminates the problem of nonperpendicularity in the element ground tracks and requires only that the rectangular ground patch of interest be entirely covered by the ground tracks of the array elements in one swath. As an added benefit of this approach, the skewing of the ground tracks caused by the velocity of the spacecraft can be accounted for in the reconstruction algorithm. The need for mechanical rotation of the scan mirror on a second axis to compensate for the Z-Effect is eliminated. Moreover, the reconstruction algorithm works to reduce the number of detectors utilized to represent a given element of the pixel line as the scan angle increases. In the illustrated embodiment, three detectors per pixel line are employed at nadir. At the end of the scan, this is reduced to two detectors or one detector. This reduction in the number of detectors required to represent each element works in opposition to the 2.2 times expansion of the detector footprints. The net effect is that the reconstructed scan lines are both perpendicular to the velocity vector and represent a constant along track distance across the scan.

Subsatellite ground patch 44 of FIG. 10 represents an area of approximately 3076 km $\times$ 6 km. In this example, the earth-viewing time ($t_e$) and the turn-around/calibration time ($t_c$) have been chosen so that the skewing of the ground tracks is no more or less than that required to fully cover the ground area of interest. $t_e$ and $t_c$ are related by $$t_e + t_c = W/V_g \qquad 5)$$

where $V_g$ = ground velocity (6.575 km/sec). Increasing the turnaround/calibration time decreases earth-viewing time, makes the pattern less skewed, and thus increases the distance between the lines tangent to the extremum of the borders of the array ground track. Ideally, this distance should equal W.

The determination of $t_e$ and $t_c$ is, therefore, a function of the number of pixels per swath and the total array length. Equation (3) can be expanded to account for the spacecraft motion as follows:

$$Z = r \cos\theta + V_g(\tfrac{1}{2}t_c + Ft_e) \qquad 6)$$

where F is the fraction of the scan completed. Since during the earth-viewing time, arc length is linear with time, $$F = 1 - \left[\frac{S + 1538}{3076}\right] \qquad 7)$$

if $\phi$ is increasing, and $$F = \frac{S + 1538}{3076} \qquad 8)$$

if $\phi$ is decreasing. Combining equations (5) and (6) yields:

$$Z(S,\theta,t_c) = r(S,\theta)\cos\theta + F(S)[W - V_g t_c] + \tfrac{1}{2}V_g t_c \qquad 9)$$

Theta corresponding to the outside edge of the first detector ground track is given as $$\theta_F = \pi/2 + \mathrm{TAN}^{-1}\left[\frac{n(.6\ \mathrm{km})}{2p(833\ \mathrm{km})}\right] \qquad 10)$$

where n equals the total number of detectors in the linear array, and p equals the degree of pixel subdivision (3).

Theta corresponding to the outside edge of the last detector ground track is given as:

$$\theta_L = \pi/2 - \mathrm{TAN}^{-1}\left[\frac{n(.6\ \mathrm{km})}{2p(833\ \mathrm{km})}\right] \qquad 11)$$

Taking the derivative with respect to S of equation (9) (assume $\phi$ is increasing), setting it equal to zero, and solving for $t_c$ yields:

$$t_c(S,\theta) = \qquad 12)$$

-continued $$\frac{\cos\theta}{V_g}\left[-\frac{1}{2a} - \frac{b}{4a^2}\left(\frac{b^2}{4a^2} - \frac{c}{a}\right)^{-\frac{1}{2}}\right]3076(-2D\sin\theta\cos\phi)\left[\frac{-1}{1+[f(s)]^2}\right]\frac{[D-R\cos(S/R)]\cos(S/R) - R\sin^2(S/R)}{[D-R\cos(S/R)]^2} +$$

$$\frac{L}{V_g} \text{ where } f(S) = \left[\frac{R\sin(S/R)}{D-R\cos(S/R)}\right], \phi = \pi/2 - \text{TAN}^{-1}[f(S)]$$

Finally, impose the condition that:

$$Z(-S, \theta_L, t_c) - Z(S, \theta_F, t_c) = W \quad (13)$$

If all but the two end detectors at nadir are used, then $W = 0.6$ km $\times$ 10 = 6 km. The arc length, which satisfies the above equations, is 295 km, and turn around time, $t_c$, is 0.24 seconds.

Pixel Reconstruction Algorithm

The algorithm by which each pixel line is reconstructed is as follows:

1. Let the pixels be numbered $J = [1, 2, \ldots, 9, 10]$ with pixel 10 having the largest Z value.
2. Let the elements of the subdivided pixels be numbered $I = [1, 2, \ldots, 5126, 5127]$ with element 5127 having the largest X value.
3. Let the array detectors be numbered $E = [1, 2, \ldots, 31, 32]$ with the projection of detector 32 having the largest Z value.

Then,
$S = 0.6 (I-1) - 1537.8$
$\beta = S/R$
$X = R \sin \beta$
$Y = D - R \cos \beta$
$Z_O = 0.6 \times (J-1) - 3 - (W - V_g t_c)(F-178)$
$Z_1 = 0.6 \times J - 3 - (W - V_g t_c)(F-\frac{1}{2})$ $$\theta_0 = \cos^{-1}\left[\frac{Z_0}{(X^2 + Y^2 + Z_0^2)^{\frac{1}{2}}}\right]$$

$$\theta_1 = \cos^{-1}\left[\frac{Z_1}{(X^2 + Y^2 + Z_1^2)^{\frac{1}{2}}}\right]$$

$$\theta_E = \frac{\pi}{2} + \text{TAN}^{-1}\left[\frac{3.1 - .2(E-1)}{833}\right]$$

where 833 km is equal to the satellite altitude.

Then, detector #E is used for pixel #J, element (or IFOV) #I iff:

$\theta_1 > \theta_E > \theta_0$

Figure 11:
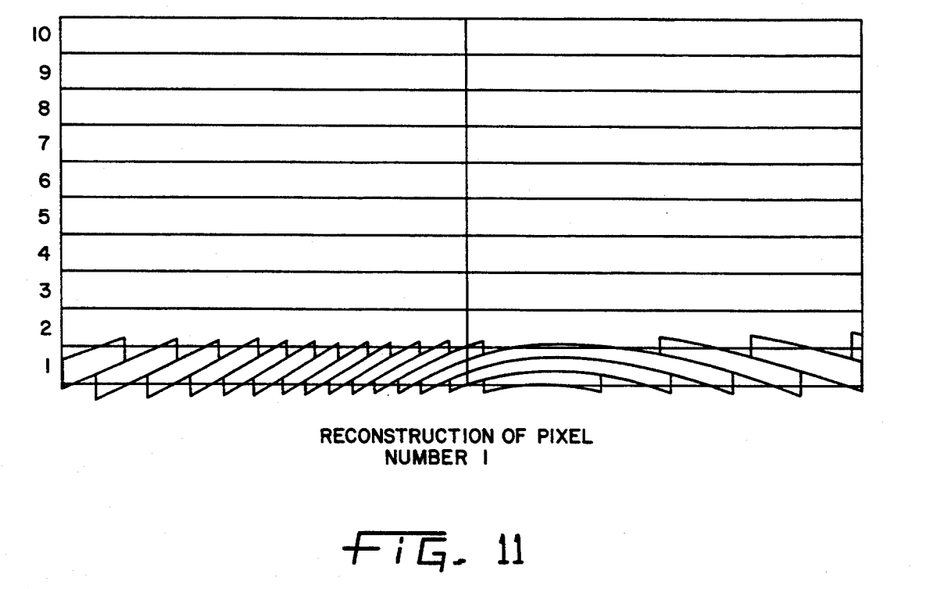
FIG. 11 illustrates the manner in which the outputs of the detectors are selected and combined to reconstruct pixel line no. 1 of FIG. 10 in accordance with a specified reconstruction algorithm.

FIG. 11 illustrates how the above algorithm reconstructs pixel number 1 across the scan. The result is an effectively constant 600 meter pixel which is perpendicular to the velocity vector. The above algorithm applies to the case of a normal resolution, 32 element array in which the elements are not staggered. The algorithm for an array having two staggered rows of elements is more involved and requires means to store outputs from the preceding element row.

It should also be noted that, for purposes of clarity and illustration, the algorithm as formulated above (and in the corresponding claims) is not completely parametric and, accordingly, applies only to the specific example under discussion. However, it will be apparent to those of ordinary skill in the art that this algorithm can be readily adapted to other specified circumstances, and such adaptions are considered by the inventor to be equivalent to, and to fall within the scope of, the invention embodied in the algorithm.

The Scan Function

The time required for each scan of the reciprocating whiskbroom scanner is defined above as including $t_e$, the earth-viewing time, and $t_c$, the turn-around/calibration time. If the scanning element moves at a constant angular velocity, the array footprint will travel along the earth at a non-constant velocity. Conversely, achieving a constant ground velocity of the array footprint will require a non-constant angular velocity of the scanning element. Use of a varying scan velocity to produce a constant ground velocity of the array footprint means, in turn, that constant integration times for the detector outputs are necessary to achieve a constant resolution in the in-scan direction.

Figure 12:
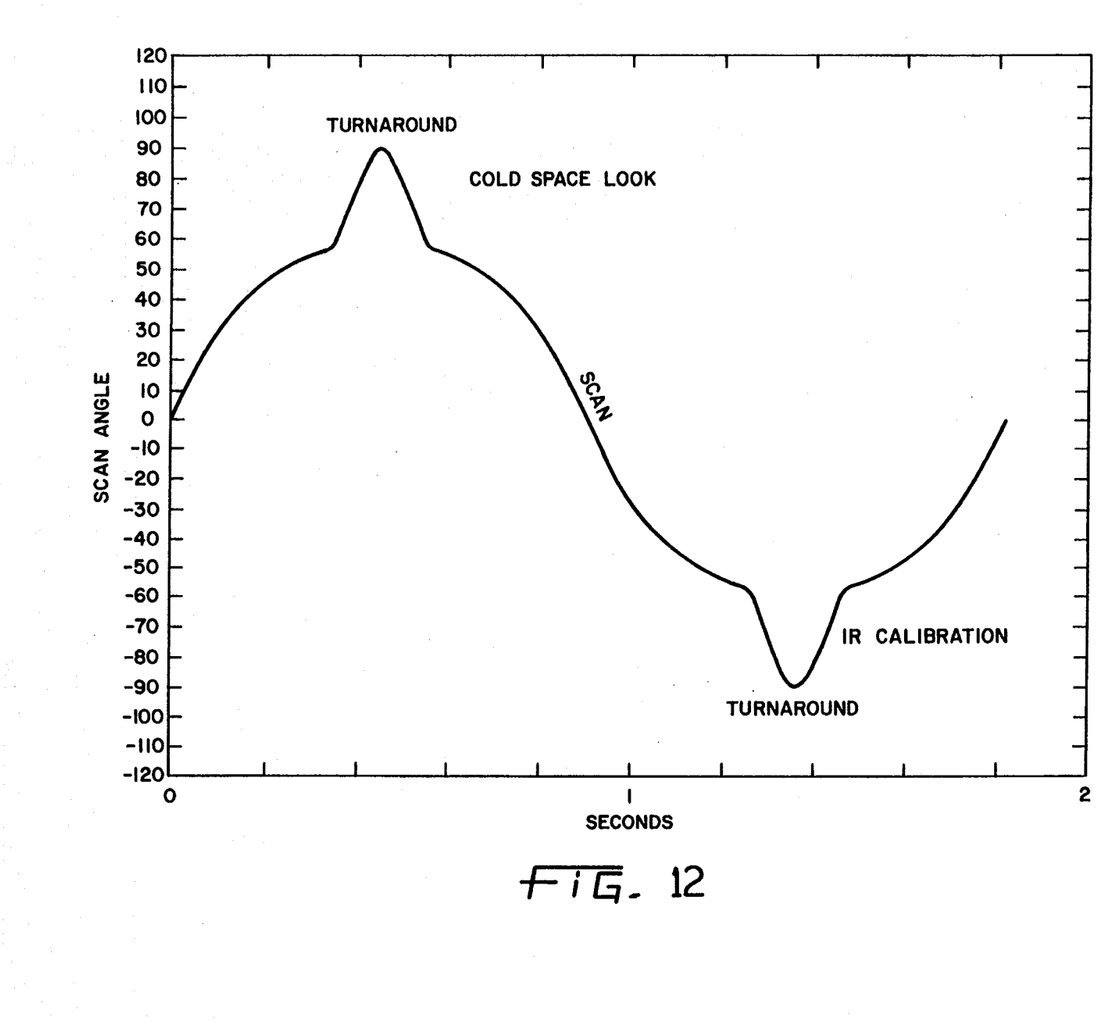
FIG. 12 shows a scan function which will provide for constant ground velocity of the array footprint.

FIG. 12 shows a scan function which will provide for constant ground velocity of the array footprint. The function is sinusoidal, with the two excursions at $\pm 90°$ representing IR and cold space calibration looks.

The factors influencing the determination of array length (number of detectors) are 1) the required sensitivity; 2) the avoidance of undue complexity; 3) the mechanical ramifications of the resulting scan speed/momentum; 4) the impacts on optical system design; 5) the state of detector technology (obtainability and cost); and 6) the performance/complexity tradeoff that drives the detector readout design. From a cursory consideration of these factors, an array length of 128 appears to be a good choice. The use of 64 or 256 detectors is also plausible.

Determining the best degree of pixel line subdivision is relatively straight-forward. Because there is a 2.2 expansion factor in the cross-scan dimension in the example discussed above, 3 is the smallest divisor that could be used. Therefore, at the end of scan, 600 meters across the scan corresponds to 3/2.2 = 1.36 detector angular subtenses. When the electronics select one detector, the cross-scan resolution is 441 meters. When the electronics select two detectors, the cross-scan resolution is 882 meters. This deviation is worst case. Closer to nadir, deviation from the desired 600 meters is much smaller. Less coarse transitions are obtainable by subdividing by a larger number. However, system complexity and the resolution limit imposed by diffraction weigh heavily against subdividing by more than 3 in the illustrative arrangement discussed above.

Optimization of the in-scan detector subtense involves a tradeoff of geometric resolution versus sensitivity. The "optimal" subtense may also vary with the type of detector used and the particular specifications and requirements of the system.

The above discussion assumes that the image on the focal plane has been derotated, i.e., image rotation effects due to off-nadir scan angles have been removed (by a device such as a K-mirror, for example).

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A method of providing a geometrically corrected large angle whiskbroom scan of a portion of the earth's surface comprising:

providing a linear array of radiation-sensitive detectors mounted in a low earth orbiting satellite oriented along the direction of the satellite's ground track;

scanning a portion of the earth's surface with the detector array to define on said surface an irregularly-shaped swath which represents a field of view of the array;

defining a regularly-shaped ground area of interest within the field of view of the array;

dividing the ground area of interest into a plurality of pixel lines extending generally perpendicularly to the linear array, the number of pixel lines being fewer in number than the number of detectors in the array;

subdividing each pixel line into a plurality of pixels, each pixel encompassing at least a portion of a field of view of one or more of the detectors in the array;

selectively combining outputs from the detectors to provide a data signal representative of each individual pixel in each pixel line; and reconstructing a representation of the ground area of interest from the data signals, the in-scan detector subtense corresponding to a distance of at least approximate 500 meters along the ground.

2. A method according to claim 1, wherein the ground area of interest is rectangularly-shaped and extends in the along-scan direction generally perpendicularly from the linear array.

3. A method according to claim 1, wherein the ratio of detectors in the array to pixel lines is at least three-to-one.

4. A method according to claim 1, wherein the step of selectively combining outputs from one or more detectors to provide a data signal representative of each of the individual elements in each pixel line includes normalizing the combined outputs to provide constant resolution across the scan.

5. A method according to claim 1, wherein satellite altitude is equal to 833 km, pixel line width (along track) is equal to 0.6 km, scan angle is equal to $\pm 56.26°$, and the outputs of three detectors per pixel line are combined to provide the data signal representative of said pixel line at nadir; and wherein the satellite is positioned at the origin of a spherical coordinate system and moves along the Z axis, the earth's surface is approximated as being cylindrical and extends parallel to the Z axis and is spaced a distance Y from the origin, the along-scan direction parallels the X axis, $\theta =$ an angle between the Z-axis and a line of sight of the detectors, and $\phi =$ an instantaneous scan angle measured from the X axis; and wherein the expression for the earth's surface is
   $x^2 + (y-D)^2 = R^2$ where
   R=6371 km (earth's radius)
   D=6371 km+833 km=7204 km (earth's radius plus satellite altitude); and wherein the expression for r, the line of sight between the detectors and earth, is $$r = \frac{-b - \sqrt{b^2 - 4ac}}{2a}$$

where
   $a = \sin^2 \theta$
   $b = -2D \sin \theta \sin \phi$
   $c = D^2 - R^2$; and wherein half of the cross-scan dimension is represented by
   $Z = r \cos \theta$; and wherein the in-scan dimension (arc length) is given by
   $S = R\beta$
   where $$\beta = \sin^{-1}\left[\frac{D}{R} \sin(\pi/2 - \phi)\right] - (\pi/2 - \phi);$$

and
   wherein
   $t_c + t_c = W/V_g$
   where
   $t_c =$ an earth's viewing time
   $t_c =$ a turn-around/calibration time
   $V_g =$ a ground velocity of the satellite
   $W =$ a distance between two lines tangent to the extremum of the swath; and wherein for an arrangement having 32 array detectors and 10 pixel lines, each subdivided into 5127 elements, each pixel line is reconstructed as follows:

1. Let the pixel lines be numbered $J = [1, 2, \ldots, 9, 10]$ with pixel line 10 having the largest Z value;
   2. Let the pixels of each of the lines be numbered $I = [1, 2, \ldots, 5126, 5127]$ with pixel 5127 having the largest X value;
   3. Let the array detectors be numbered $E = [1, 2, \ldots, 31, 32]$ with the projection of detector 32 having the largest Z value;

then,
   $S = 0.6 (I-1) - 1537.8$
   $\beta = S/R$
   $X = R \sin \beta$
   $Y = D - R \cos \beta$
   $Z_0 = 0.6 \times (J-1) - 3 - (W - V_g t_c)(F - \frac{1}{2})$
   $Z_1 = 0.6 \times J - 3 - (W - V_g t_c)(F - \frac{1}{2})$ $$\theta_0 = \cos^{-1}\left[\frac{Z_0}{(X^2 + Y^2 + Z_0^2)^{\frac{1}{2}}}\right]$$

$$\theta_1 = \cos^{-1}\left[\frac{Z_1}{(X^2 + Y^2 + Z_1^2)^{\frac{1}{2}}}\right]$$

$$\theta_E = \frac{\pi}{2} + \tan^{-1}\left[\frac{3.1 - .2(E-1)}{833}\right];$$

then, detector #E is used for line #J, pixel #I iff:

$\theta_1 > \theta_E > \theta_0$.

6. A method according to claim 1, wherein said scanning step includes scanning the portion of the earth's surface in accordance with a sinusoidal scan function to provide for a constant ground velocity of the array footprint.

7. A method according to claim 6, wherein said scan function includes excursions at ±90° for calibration purposes.

8. An apparatus for providing a geometrically corrected large angle whiskbroom scan of a portion of the earth's surface comprising:
   a linear array of radiation-sensitive detectors mounted in a low earth orbiting satellite oriented along the direction of the satellite's ground track;
   means for sweeping the field to which the radiation-sensitive detectors of the array are exposed generally transversely to the direction of the satellite's ground track;
   means for scanning a portion of the earth's surface with the detector array to define on said surface an irregularly-shaped swath which represents a field of view of the array;
   means for defining a regularly-shaped ground area of interest within the field of view of the array;
   means for dividing the ground area of interest into a plurality of pixel lines extending generally perpendicularly to the linear array, the number of pixel lines being fewer in number than the number of detectors in the array;
   means for subdividing each pixel line into a plurality of pixels, each pixel encompassing at least a portion of a field of view of one or more of the detectors in the array;
   means for selectively combining outputs from one or more detectors to provide a data signal representative of each of the individual pixels in each pixel line; and
   means for reconstructing a representation of the ground area of interest from the data signals,
   the in-scan detector subtense corresponding to a distance of at least approximately 500 meters along the ground.

9. An apparatus according to claim 8, wherein the ground area of interest is rectangularly-shaped and extends in the along-scan direction generally perpendicularly from the linear array.

10. An apparatus according to claim 8, wherein the ratio of detectors in the array to pixel lines is at least three-to-one.

11. An apparatus according to claim 8, wherein the means for selectively combining outputs from one or more detectors to provide a data signal representative of each of the individual elements in each pixel line includes means for normalizing the combined outputs to provide constant resolution across the scan.

12. An apparatus according to claim 8,
   wherein satellite altitude is equal to 833 km, pixel line width (along track) is equal to 0.6 km, scan angle is equal to ±56.26°, and the outputs of three detectors per pixel line are combined to provide the data signal representative of said pixel line at nadir; and
   wherein the satellite is positioned at the origin of a spherical coordinate system and moves along the Z axis, the earth's surface is approximated as being cylindrical and extends parallel to the Z axis and is spaced a distance Y from the origin, the along-scan direction parallels the X axis, $\theta$=an angle between the Z-axis and a line of sight of the detectors, and $\phi$=an instantaneous scan angle measured from the X axis; and;
   wherein the expression for the earth's surface is $$x^2 + (y-D)^2 = R^2$$

where
   R=6371 km (earth's radius)
   D=6371 km+833 km=7204 km (earth's radius plus satellite altitude); and
wherein the expression for r, the line of sight between the detectors and earth, is $$r = \frac{-b - \sqrt{b^2 - 4ac}}{2a}$$

where
   $a = \sin^2 \theta$
   $b = -2D \sin \theta \sin \phi$
   $c = D^2 - R^2$; and
wherein half of the cross-scan dimension is represented by
   $Z = r \cos \theta$; and
wherein the in-scan dimension (arc length) is given by
   $S = R \beta$
where $$\beta = \sin^{-1}\left[\frac{D}{R} \sin(\pi/2 - \phi)\right] - (\pi/2 - \phi);$$

and
wherein
$t_e + t_c = W/V_g$
where
   $t_e$=an earth's viewing time
   $t_c$=a turn-around/calibration time
   $V_g$=a ground velocity of the satellite
   W=a distance between two lines tangent to the extremum of the swath; and
wherein for an arrangement having 32 array detectors and 10 pixel lines, each subdivided into 5127 pixels, each pixel line is reconstructed as follows:
1. Let the pixel lines be numbered J=[1, 2, ..., 9, 10] with pixel line 10 having the largest Z value;
2. Let the pixels of each of the lines be numbered I=[1, 2, ..., 5126, 5127] with pixel 5127 having the largest X value;
3. Let the array detectors be numbered E=[1, 2, ..., 31, 32] with the projection of detector 32 having the largest Z value;
then,
   S=0.6 (I−1)−1537.8
   $\beta$=S/R
   X=R Sin $\beta$
   Y=D−R cos $\beta$
   $Z_0$=0.6 X (J−1)−3−(W−$V_g t_c$)(F−½)
   $Z_1$=0.6 X J−3−(W−$V_g t_c$)(F−½)

$$\theta_0 = \cos^{-1}\left[\frac{Z_0}{(X^2 + Y^2 + Z_0^2)^{\frac{1}{2}}}\right]$$

$$\theta_1 = \cos^{-1}\left[\frac{Z_1}{(X^2 + Y^2 + Z_1^2)^{\frac{1}{2}}}\right]$$

$$\theta_E = \frac{\pi}{2} + \tan^{-1}\left[\frac{3.1 - .2(E-1)}{833}\right];$$

then, detector #E is used for line #J, pixel #I iff:

$$\theta_1 > \theta_E > \theta_0.$$

13. An apparatus according to claim 8, wherein said means for scanning has a sinusoidal scan function to provide for a constant ground velocity of the array footprint.

14. An apparatus according to claim 13, wherein said scan function includes excursions at ±90° for calibration purposes.

* * * * *